United States Patent [19]

Bernard et al.

[11] Patent Number: 5,703,483

[45] Date of Patent: Dec. 30, 1997

[54] PULSE TACHOMETER WITH SENDER CONNECTED TO INDUCTIVE PROXIMITY SENSOR

[75] Inventors: Patrick Bernard, Limours; Jean-Pierre Atton, Paray Vieille Poste, both of France

[73] Assignee: Electricite de France-Service National, Paris, France

[21] Appl. No.: 521,983

[22] Filed: Aug. 31, 1995

[30] Foreign Application Priority Data

Sep. 1, 1994 [FR] France .................. 94 10533

[51] Int. Cl.[6] .................. G01P 3/44; G01P 3/487; G01P 3/488; H04B 10/08
[52] U.S. Cl. .................. 324/173; 324/166
[58] Field of Search .................. 324/166, 173, 324/174, 175, 160, 207.25, 207.13, 207.14, 207.15

[56] References Cited

U.S. PATENT DOCUMENTS 5,384,534  1/1995  Bjork .................. 324/174

FOREIGN PATENT DOCUMENTS 3126023  1/1983  Germany .
9014753  3/1991  Germany .

Primary Examiner—Walter E. Snow
Attorney, Agent, or Firm—Sughrue, Mion, Zinn, Macpeak & Seas, PLLC

[57] ABSTRACT

The pulse tachometer for measuring the rotation of a rotating element (A) is characterized in that it comprises an inductive proximity sensor (10) placed in the vicinity of this element (A) in order to generate an electric pulse (100) upon each revolution of the element (A), a sender (20) connected to this sensor (10) for receive this electric pulse (100), shaping it and converting it into an optical signal, an optical-fibre link (30) connected to this sender (20) and to a receiver (40) for receiving this optical signal from the sender (20) and routing it to this receiver (40) in order to use it so as to calculate the speed of the rotating element. Application to rotating machines, for example turbine generators.

7 Claims, 2 Drawing Sheets

PULSE TACHOMETER WITH SENDER CONNECTED TO INDUCTIVE PROXIMITY SENSOR

The present invention relates to an improved pulse tachometer and, more particularly, to such a tachometer intended to measure the rotation of a rotating element from an electric pulse which is generated upon each revolution of the element and which is next processed electronically and converted optically.

In many technical sectors, it is necessary to measure the rotation of the rotating element, such as a shaft, with precision, in order to measure the instantaneous speed thereof and/or its variations.

Such is the case, for example, of thermal or nuclear electric power stations, where it is necessary to take an extremely precise measurement of the speed of rotation of a rotating machine, for example of a turbine generator upon each revolution of the shaft and, preferably, around the rated speed of the latter, in particular for monitoring the low-pressure turbine blade discs so as to detect defects or degradation which may occur, for example on the vanes.

Tachometers known as "pip-revolution" tachometers are usually employed, that is to say tachometers which emit a pulse upon each revolution of a rotating element to be observed, such as a shaft.

For the case of the application to low-pressure turbines of electric power stations, in which the rated rotational speed of a shaft is usually 1500 rpm, the variations in rotational speed lying between 1498 rpm and 1502 rpm are monitored, and then sixteen speed classes are distinguished, which are equally distributed in this bracket about the rated rotational speed. Given that in practice a "pip-revolution" pulse is delivered upon each revolution of the shaft, the rotational period is calculated upon each revolution by the difference between the instants when two successive pulses are produced. In this case, the width of a speed class is therefore equal to 0.25 rpm, and the minimum relative precision with which the speed is known about the rated speed is equal to about $1.7 \times 10^{-4}$.

Thus it is seen that, at the rated speed of 1500 rpm, i.e. a frequency of 25 Hz, the period is equal to 40 ms.

With the period of rotation being estimated by the difference in the instants at which two successive pulses occur, the precision in the instant at which each pulse occurs or appears must therefore be better than about 3 μs.

The difficulties existing in making measurements under such conditions can well be understood.

In order to resolve this type of difficulty, it has been proposed to employ optical tachometers or electromagnetic tachometers.

Optical tachometers use a laser, the pencil beam of which, emitted towards the shaft, is reflected and sent back by a mirror fixed to the latter so as, upon each revolution, to produce an optical pulse which is detected and processed by appropriate electronic circuits in order to deduce the rotational speed therefrom upon each revolution. Although such a solution makes it possible to achieve precision well superior to the required precision, it exhibits drawbacks related to its fragility, to the dirtying of certain optical components but particularly of the mirror which is fastened to the shaft, and to the difficulties in optical setting-up which is always tricky to carry out. Such a solution is well suited to the laboratory, but it is particularly poorly adapted to operation in an industrial setting.

Electronic tachometers use an electromagnetic sensor, with a permanent magnet in front of which a metal piece carried by the shaft moves so as, upon each revolution, to produce an electric pulse which is detected and processed by appropriate electronic circuits in order to deduce the rotational speed therefrom upon each revolution, such as the teeth of the polar wheel of a turbine generator unit. This solution produces an analogue sinusoidal electric signal which is proportional to the speed as it is commensurate with the variation in the magnetic flux. When the speed increases, the period of the sinusoid shortens while its amplitude increases. Such a sensor thus acts as an analogue speed/voltage converter. This solution exhibits the drawback of being unsuitable for low speeds, for example speeds below 200 rpm, since the electric signal is then weak and difficult to distinguish from the background noise and, in any case, of being sensitive to electromagnetic interference picked up by the sensor, particularly outside of the pulse which is due to the passage of the metal piece.

The purpose of the invention is to construct an improved pulse tachometer which remedies the major part of the briefly restated drawbacks of the existing solutions, and which can operate in an industrial setting with a severe or even hostile environment.

The subject of the invention is a pulse tachometer for measuring the rotation of a rotating element, comprising an inductive proximity sensor placed in the vicinity of this element in order to generate an electric pulse upon each revolution of the element, characterized in that it comprises a sender connected to this sensor in order to receive this electric pulse, shape it and convert it into an optical signal, and an optical-fibre link connected to this sender and to a receiver for receiving this optical signal from the sender and routing it to this receiver in order to use it so as to calculate the speed of the rotating element, the said sender comprising a shaping circuit for stretching the duration of the electric pulse, and a converter for converting the stretched electric pulse into an optical signal.

A further subject of the invention is the application of such a tachometer to measuring the rotational speed of a shaft of a rotating machine of an electric power station.

Other characteristics of the invention will emerge upon reading the description and the claims which follow, as well as on examining the figures of the attached drawing, given solely by way of example, in which:

Figure 1:
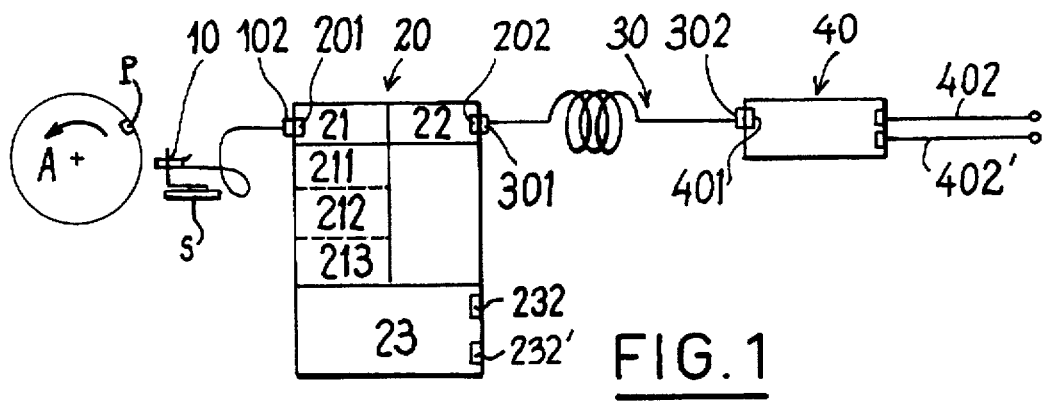
FIG. 1 is a block diagram of an embodiment of a tachometer according to the invention.
Figure 3:
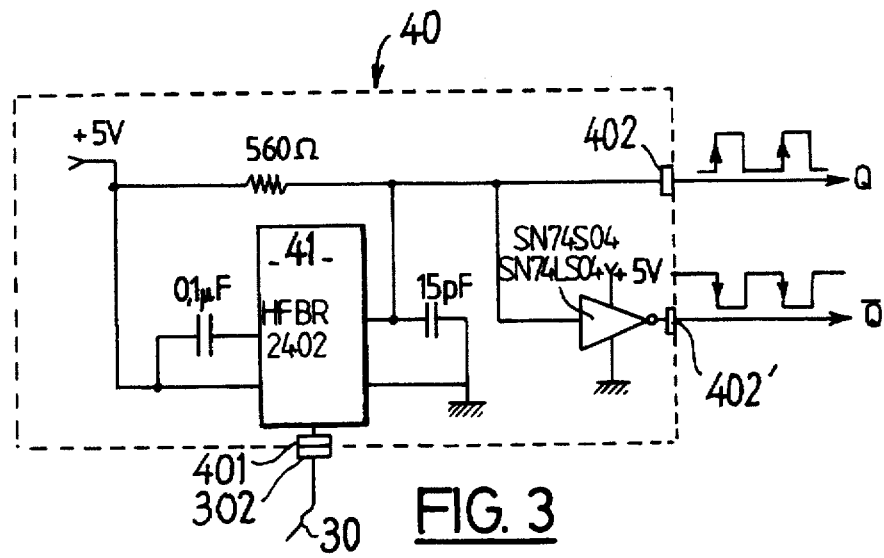
FIG. 3 is a diagrammatic view of an embodiment of a receiver for a tachometer according to the invention.

Pulse tachometers of the "pip-revolution" type, for measuring the rotational speed of a rotating element by the use of a pulse created upon each revolution of the element and, in particular, the tachometers used in electric power stations, being well known in the art, only that which directly or indirectly concerns the invention will be described in what follows. For the rest, the person skilled in the art of the technical sector in question will draw on the current conventional solutions at his disposal to confront the specific problems with which he is faced.

In what follows, the same reference number is always used to identify a corresponding element, whatever the embodiment or its implementation variation.

For ease of description, each of the component parts of an improved tachometer according to the invention will be described, before setting out the construction as required, and the operation thereof.

A pulse tachometer according to the invention essentially comprises an inductive proximity sensor 10 placed in the vicinity of a rotating element such as a shaft A in order to generate an electric pulse 100 upon each revolution of this element, a sender 20 connected to this sensor for receiving this electric pulse 100, shaping it and converting it into an optical signal, an optical-fibre link 30 connected to this sender and to a receiver 40 for receiving this optical signal from the sender and routing it to this receiver in order to use it so as to calculate the speed of the element.

The sensor 10 essentially comprises an oscillator with coils, a transistorized shaper processing circuit and an output stage with an output terminal 102.

The coils of the oscillator, including one active coil and one reference coil mounted in series, constitute the sensitive face of the sensor and the oscillator maintains an alternating current therein which generates an oscillating magnetic field. Each time a metal piece P, or other piece, associated with the rotating shaft or element moves into the magnetic field in front of the sensor, this inducing magnetic field creates eddy currents or induced currents in this metal piece which then acts like the secondary of a short-circuit transformer; this entails an increase in the inducing supply current and the stopping of the oscillations. A transistorized shaping circuit, with a high-speed NPN or PNP transistor output, detects the abrupt variation in current and then delivers a logic signal of constant level, for example 0 or 1, according to the absence or the presence of the metal piece. Such a logic signal appears at the output stage which, in particular, preferably comprises a demodulator connected to the output of the oscillator. The series coils of the oscillator are connected in parallel simultaneously with two capacitors in series and with two resistors in series, and the terminals common to the coils, capacitors and resistors are linked to the inputs of the oscillator. The point common to the series coils and the point common to the capacitors are earthed. The point common to the resistors is linked to the input of the demodulator via an amplifier.

The sender 20 essentially comprises a shaping circuit 21 for stretching the duration of the electric pulse 100, and a converter 22 for converting the stretched electric pulse into an optical signal. It also comprises an input terminal 201 and an output terminal 202.

The shaping circuit 21 essentially comprises an operational amplifier 211, a diode 212 connected to one output of the amplifier 211, and a programmable changeover switch 213 connected to the output of the amplifier 211, the other input of the amplifier being grounded.

The programmable changeover switch 213 comprises an electronic switch 2131 and a drive circuit 2132 which controls it. As can be seen by examining the detailed diagram of FIG. 2, the drive circuit 2132 particularly comprises a first and a second delay device or "timer" preferably combined in the same component 2130. The drive circuit also comprises two operational amplifiers connected to the component 2130 and to the switch 2131, and which serves solely to invert the pulses so that they are acted upon by one or other of the component and switch. The duration of the state in which the first timer remains is set by the use of a RC mounting between, for example, zero and about a few milliseconds, and the length of the delay is adjusted by the use of a potentiometer between, for example, zero and about fifty milliseconds. The second timer delivers a "stretched" pulse of fixed "width" obtained by a RC mounting, for example 1.6 ms, which is sufficient to cause the switch locking the loop to open.

This shaping circuit behaves as a monostable circuit to which a memory effect is introduced by the diode. In the absence of an electric pulse originating from the sensor, that is to say when the logic level is low, which situation corresponds to the absence of the metal piece, the output of the amplifier remains in the low state. When a pulse from the sensor arrives at the instant when the piece passes, the rising edge of the pulse crosses the reference threshold and the output of the sensor latches to the high state. The high state of the output is thereupon transmitted to the positive input of the amplifier which is looped: the output of the amplifier always remains in the high state even if the pulse has passed, and even if the low level produced by the sensor has reappeared. Thus it is seen that the output of the amplifier remains locked at the high state whatever the state of the sensor, excited or otherwise. In order to unlock the amplifier, it suffices to open the loop, when there is no pulse originating from the sensor, using the programmable changeover switch which is controlled by a stretched pulse arriving late with respect to the initial pulse from the sensor.

Upon the arrival of a pulse from the sensor (rising edge), the amplifier latches over and locks to the high state. This pulse from the sensor also triggers the first timer the output of which remains in the high state for the adjustable duration and with the chosen delay. When the first timer latches over at the end of the preestablished time delay, it triggers the second timer which delivers the "stretched" pulse of fixed "width" which is sufficient to cause opening of the electronic switch locking the loop. It will be observed that the time delay at the end of which the stretched pulse, for example of 1.6 ms, is produced after the arrival of the pulse from the sensor has to be less than the minimum period to be measured. If such were not the case, the duration of the stretched pulses will be longer than the interval which separates two successive pulses originating from the sensor.

When the pulse from the sensor has passed and the switch is open, the output of the operational amplifier latches back to the low state.

The switch then closes almost immediately, but the output of the operational amplifier remains in the low state since its positive input is in the low state. It is then sufficient to await the arrival of the following pulse from the sensor for the process to be reproduced.

The converter 22 such as a light-emitting diode or the like is fed by a high-speed switching transistor the collector of which is connected via a potentiometer. The intensity of the light emitted is adjusted optimally as a function of the characteristics of the optical-fibre link, in particular of its length.

Figure 2:
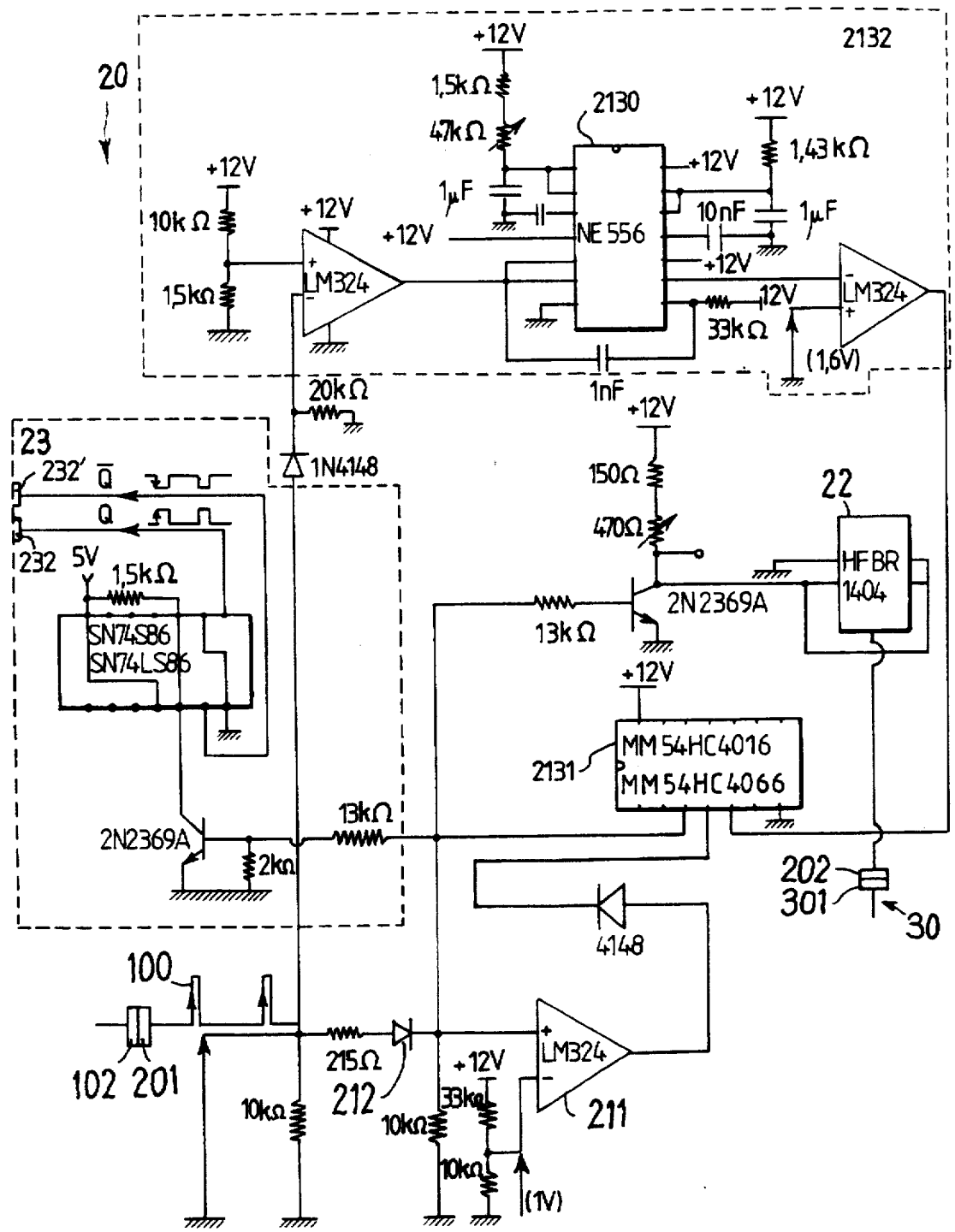
FIG. 2 is a detailed view of an embodiment of a sender for a tachometer according to the invention.

By examining FIG. 2, it will be observed that, so as to eliminate any changeover switching delay, the control signal applied to the base of the transistor is picked off directly from the positive input of the operational amplifier.

The full benefit of this circuit is grasped immediately. The original rising edge of the pulse is kept for triggering the transistor circuit which feeds the converter which converts the stretched electric pulse into an optical signal.

For preference, the sender 20 comprises an auxiliary circuit 23 for monitoring the occurrence of the electric pulses from the sensor. To do that, at least one TTL (Transistor-Transistor-Logic) electrical output is used, linked to a standardized BNC connector. The output signal available may have a triggering rising edge or equally a triggering falling edge by virtue of an internal selection inverter of the exclusive-OR type. Instead of having a single output 232, this auxiliary circuit may have two outputs which are usable simultaneously, output 232 and output 232'. These outputs make it possible, for example, to monitor the occurrence of the pulses from the sensor on an oscilloscope, or equally to control the triggering of a stroboscope the light flashes from which are synchronized and locked to the instantaneous rotational speed of the shaft which, that being so, then appears static, so as to examine the piece, or any other component integral with the shaft, at leisure.

The optical-fibre link 30, with an input 301 and an output 302 is established by choosing a fibre matched to the converter 22 so that the attenuation of the fibre is a minimum for the emission wavelength of the converter, for example 6 dB/km. For preference, an optical fibre will be adopted the core of which allows for multi-mode use and provides maximum transmission of luminous energy.

The fibre is protected by a sheath particularly in order to obtain better mechanical strength, suitably adapted if need be in order to be more "hardened" so as to make it possible to place the fibre, if required, at least locally in a hostile environment where nuclear radiation is present.

The fibre is equipped at each of its input and output ends with standardized connectors, for example SMA screw-type.

The receiver 40 is designed to receive the optical signal generated by the sender 20 and transported by the link 30. The receiver, with one input terminal 401 and at least one output terminal 402, thus comprises a receiving photodiode 41 or the like, which converts the optical signal into an electrical signal in the form of a pulse of defined duration, of the TTL (Transistor-Transistor-Logic) type, up to a speed of 5 M.baud.

This receiver is provided with a main output where the TTL pulses, with triggering rising edges, appear, and, if appropriate, with an auxiliary output 402' where these pulses appear inverted, with triggering falling edges.

It is these outputs which are connected to appropriate circuits of any conventional type, for processing TTL signals so as to deduce the speed of the shaft therefrom.

All the component parts of the tachometer according to the invention are connected to one another as is apparent on examining the diagrammatic FIG. 1. It will be observed that the sensor 10 is preferably mounted on an adjustable support S such as a single-axis (X) micrometer plate, for example, so as to optimize the signal produced by the sensor by moving the sensor relative to the shaft.

Figure 4A:
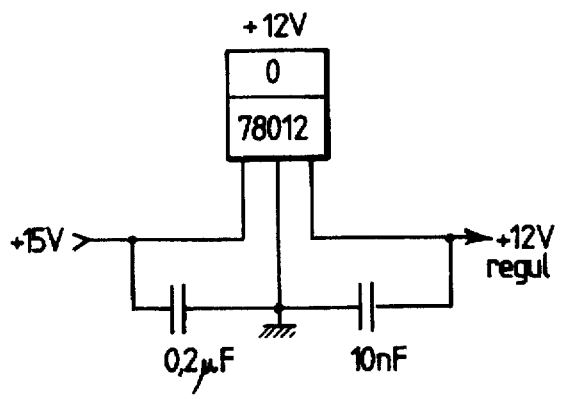
FIGS. 4A and 4B, illustrate diagrams of power supply circuits which can be used for the sender and/or the receiver of the tachometer according to the invention.
Figure 4B:
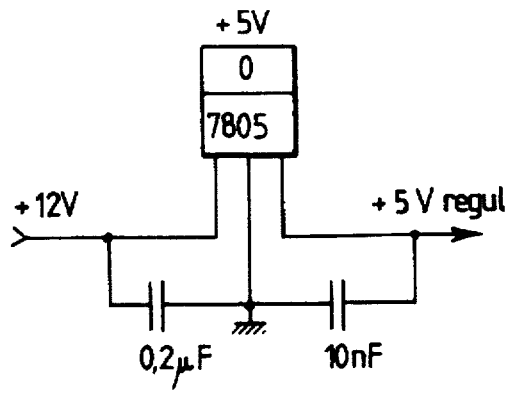

Power supplies of any conventional type deliver 5 V and 12 V DC voltages necessary for the operation of the sender 20 and of the receiver 40. Such power supplies are illustrated, for example, in FIGS. 4A and 4B.

A sensor which is well suited is that which bears the reference XS4-P08PA340-D in the catalogue from the TELEMECANIQUE company.

A fibre which is well suited is that which bears the reference HCP MO200T in the catalogue of the ENSIGN-BICKFORD company.

The components of the electronic circuits, some of which are referenced on the diagrams of the figures as indicated in the manufacturer's catalogues, are available from the companies TEXAS INSTRUMENTS, HEWLETT PACKARD, NATIONAL SEMICONDUCTOR CORPORATION, for example.

Hence it is seen that the tachometer according to the invention employs a circuit to "stretch" a pulse, and which does not require high qualities of speed and of stability, and the cost of which is therefore reduced.

The foregoing brings clearly to light the distinctive features of the invention, the benefit which it offers and the advantages which it confers.

We claim:

1. Pulse tachometer for measuring the rotation of a rotating element (A), comprising an inductive proximity sensor (10) placed in the vicinity of this element (A) in order to generate an electric pulse (100) upon each revolution of the element (A), characterized in that it comprises a sender (20) connected to this sensor (10) in order to receive this electric pulse (100), shape it and convert it into an optical signal, and an optical-fibre link (30) connected to this sender (20) and to a receiver (40) for receiving this optical signal from the sender (2)) and routing it to this receiver (40) in order to use it so as to calculate the speed of the rotating element, the said sender (20) comprising a shaping circuit (21) for stretching the duration of the electric pulse (100), and a converter (22) for converting the stretched electric pulse into an optical signal.

2. The tachometer according to claim 1, characterized in that the shaping circuit (21) comprises an operational amplifier (211), a diode (212) connected to one input of said operational amplifier, and a programmable changeover switch connected to an output of said amplifier, another input of said operational amplifier (211) being grounded.

3. Tachometer according to claim 2, characterized in that the programmable changeover switch (213) comprises an electronic switch (2131) and a drive circuit (2132) controlling it.

4. Tachometer according to claim 3, characterized in that the sender (20) comprises an auxiliary circuit (23) for monitoring the occurrence of the electric pulses (100).

5. The tachometer as set forth in claim 1, wherein said rotating element comprises a turbine generator shaft.

6. Tachometer according to claim 2, characterized in that the sender (20) comprises an auxiliary circuit (23) for monitoring the occurrence of the electric pulses (100).

7. Tachometer according to claim 1, characterized in that the sender (20) comprises an auxiliary circuit (23) for monitoring the occurrence of the electric pulses (100).

\* \* \* \* \*